US012510269B2

(12) United States Patent
Rice

(10) Patent No.: US 12,510,269 B2
(45) Date of Patent: Dec. 30, 2025

(54) CONDENSATE COLLECTION FOR USE WITH CONDENSING HEAT EXCHANGERS

(71) Applicant: Hamilton Sundstrand Corporation, Charlotte, NC (US)

(72) Inventor: Cory R. Rice, Weatogue, CT (US)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 114 days.

(21) Appl. No.: 18/609,716

(22) Filed: Mar. 19, 2024

(65) Prior Publication Data

US 2025/0297768 A1 Sep. 25, 2025

(51) Int. Cl.
*F24F 13/22* (2006.01)
*B64G 1/48* (2006.01)
*F24F 3/14* (2006.01)

(52) U.S. Cl.
CPC .............. *F24F 13/222* (2013.01); *B64G 1/48* (2013.01); *F24F 2003/1446* (2013.01)

(58) Field of Classification Search
CPC ........ F24F 3/1405; F24F 13/22; F24F 13/222; F24F 2003/1446; B01D 53/265; F28B 9/08; F25D 2321/147; F25D 21/14
See application file for complete search history.

(56) References Cited

U.S. PATENT DOCUMENTS

| | | | | | |
|---|---|---|---|---|---|
| 2,187,470 | A * | 1/1940 | Collins | F24F 13/22 | 165/177 |
| 3,168,137 | A * | 2/1965 | Smith | F28B 1/00 | 29/890.035 |
| 3,905,203 | A * | 9/1975 | Jacob | F24F 3/1405 | 62/93 |
| 4,383,415 | A * | 5/1983 | Jacob | F25D 21/14 | 62/81 |
| 4,515,207 | A | 5/1985 | Alario et al. | | |
| 4,830,097 | A | 5/1989 | Tanzer | | |
| 5,201,192 | A * | 4/1993 | Hara | F25D 17/08 | 62/281 |
| 8,163,243 | B1 * | 4/2012 | Burke | B64G 1/48 | 422/120 |
| 8,567,486 | B1 | 10/2013 | Wolf, Sr. | | |
| 9,097,470 | B2 | 8/2015 | Chen et al. | | |
| 10,384,318 | B1 | 8/2019 | Batty et al. | | |
| 11,754,345 | B2 | 9/2023 | Wang et al. | | |

* cited by examiner

*Primary Examiner* — Eric S Ruppert
(74) *Attorney, Agent, or Firm* — CANTOR COLBURN LLP

(57) ABSTRACT

Baffle assemblies for use with condensing heat exchangers include a housing with a portion of the housing having a water flow passage defined therein, a set of baffles extending from the housing and arranged with a fluid connection with the water flow passage. Each baffle of the set of baffles includes a baffle frame having a solid back and solid sidewalls that define an open faced baffle cavity, a primary layer arranged within the baffle cavity, wherein the primary layer comprises a geometry pattern of openings, and a secondary layer arranged within the baffle cavity between the primary layer and the back of the baffle frame, with the secondary layer being formed of a mesh of woven wires.

20 Claims, 11 Drawing Sheets

CONDENSATE COLLECTION FOR USE WITH CONDENSING HEAT EXCHANGERS

BACKGROUND

The subject matter disclosed herein generally relates to condensing heat exchangers and, more particularly, to condensing heat exchangers having condensate collection features for improved operation thereof.

Heat exchangers are utilized in various applications to exchange thermal energy between various fluid streams and may be configured to condense liquid or moisture from an airflow stream. Onboard spacecraft, recapture and recycling of air and water is important for sustaining life while minimizing components and weight carried onboard the spacecraft. In order to minimize carrying breathable air in canisters or the like, an environmental control system onboard a spacecraft may constantly cycle and recycle air within the craft (e.g., flight craft, orbiting station, non-Earth surface station, etc.). One of the features of such environmental control systems is extracting moisture from recycled air to collect as much water as possible from the air, and then supply relatively dry air back into an occupied space, and collecting or storing the water for other purposes (e.g., consumption, cleaning, cooling, or the like).

In conventional condensate reclamation systems of environmental control systems (ECS), particularly for long duration crewed spaceflight, the water reclamation employs a condensing heat exchanger (CHX) arranged along a duct or the like. For example, an ECS may include an intake, a fan or other fluid motive driver, various treatment components/elements (e.g., filters), and a CHX. The CHX is a heat exchanger assembly that is typically a brazed and welded plate/fin design that is manufactured by hand. In the CHX, the feature or structure that collects the condensate is called a 'slurper bar' and may require hydrophilic coatings to ensure moisture is both captured from a moist or humid airflow and directed to a collection space (e.g., water collection tank or the like). It has been observed that, over time, the hydrophilic coatings will degrade over time. In view of this, and other consideration, improved moisture collection for condensate reclamation may provide advantages over prior systems and improve space flight and space travel for humans.

SUMMARY

According to some embodiments, baffle assemblies for use with condensing heat exchangers are provided. The baffle assemblies include a housing, wherein a portion of the housing has a water flow passage defined therein, and a set of baffles extending from the housing and arranged with a fluid connection with the water flow passage. Each baffle of the set of baffles includes a baffle frame having a solid back and solid sidewalls that define an open faced baffle cavity, a primary layer arranged within the baffle cavity, wherein the primary layer comprises a geometry pattern of openings, and a secondary layer arranged within the baffle cavity between the primary layer and the back of the baffle frame, wherein the secondary layer comprises a mesh of woven wires.

In addition to one or more of the features described herein, or as an alternative, further embodiments of the baffle assemblies may include that each baffle comprising at least one pressure channel providing the fluid connection between a respective baffle and the water flow passage.

In addition to one or more of the features described herein, or as an alternative, further embodiments of the baffle assemblies may include that the secondary layer is a first secondary layer and each baffle comprises a second secondary layer arranged between the first secondary layer and the back of the baffle frame.

In addition to one or more of the features described herein, or as an alternative, further embodiments of the baffle assemblies may include that the second secondary layer has a mesh weave that is tighter than a mesh weave of the first secondary layer.

In addition to one or more of the features described herein, or as an alternative, further embodiments of the baffle assemblies may include that each baffle has a tapered shape with a narrow end of the tapered shape proximate the fluid connection to the water flow passage.

In addition to one or more of the features described herein, or as an alternative, further embodiments of the baffle assemblies may include a cover enclosing a portion of the secondary layer proximate the fluid connection to the water flow passage.

In addition to one or more of the features described herein, or as an alternative, further embodiments of the baffle assemblies may include that the cover is part of the primary layer.

In addition to one or more of the features described herein, or as an alternative, further embodiments of the baffle assemblies may include that the mesh of woven wires are arranged in a Dutch twill weave.

In addition to one or more of the features described herein, or as an alternative, further embodiments of the baffle assemblies may include that the set of baffles comprise first baffles arranged at a first angle relative to a direction normal to the housing and second baffles arranged at a second angle different from the first angle.

In addition to one or more of the features described herein, or as an alternative, further embodiments of the baffle assemblies may include that the water flow passage is a first water flow passage and a second water flow passage is defined within the housing parallel to the first water flow passage, wherein the set of baffles comprise first baffles arranged with outlets fluidly coupled to the first water flow passage and second baffles arranged with outlets fluidly coupled to the second water flow passage.

In addition to one or more of the features described herein, or as an alternative, further embodiments of the baffle assemblies may include that each baffle has a first end that is fluidly coupled to the water flow passage and a second end, opposite the first end, comprising a secondary water flow assembly configured to supply a secondary flow of water through at least the mesh of woven wires that flows in a direction from the second end to the first end.

According to some embodiments, heat exchanger assemblies are provided. The heat exchanger assemblies include a heat exchanger core configured to receive humid air as a first working fluid and a coolant as a second working fluid, wherein the heat exchanger is arranged to output the first working fluid as an airflow having water droplets and a baffle assembly arranged to receive the output of the first working fluid. The baffle assembly includes a housing, wherein a portion of the housing has a water flow passage defined therein and a set of baffles extending from the housing and arranged with a fluid connection with the water flow passage. Each baffle of the set of baffles includes a baffle frame having a solid back and solid sidewalls that define an open faced baffle cavity, a primary layer arranged within the baffle cavity, wherein the primary layer comprises a geometry pattern of openings, and a secondary layer arranged within the baffle cavity between the primary layer and the back of the baffle frame, wherein the secondary layer comprises a mesh of woven wires.

In addition to one or more of the features described herein, or as an alternative, further embodiments of the heat exchanger assemblies may include that the heat exchanger is a condensing heat exchanger of an environmental control system.

In addition to one or more of the features described herein, or as an alternative, further embodiments of the heat exchanger assemblies may include an outlet manifold at an outlet end of a flow path of the first working fluid through the heat exchanger core, wherein the baffle assembly is arranged within the outlet manifold.

In addition to one or more of the features described herein, or as an alternative, further embodiments of the heat exchanger assemblies may include that each baffle has a tapered shape with a narrow end of the tapered shape proximate the fluid connection to the water flow passage.

In addition to one or more of the features described herein, or as an alternative, further embodiments of the heat exchanger assemblies may include that the set of baffles comprise first baffles arranged at a first angle relative to a flow direction of the first working fluid as it exits the heat exchanger core and second baffles arranged at a second angle different from the first angle relative to the flow direction.

In addition to one or more of the features described herein, or as an alternative, further embodiments of the heat exchanger assemblies may include that the water flow passage is a first water flow passage and a second water flow passage is defined within the housing parallel to the first water flow passage, wherein the set of baffles comprise first baffles arranged with outlets fluidly coupled to the first water flow passage and second baffles arranged with outlets fluidly coupled to the second water flow passage.

In addition to one or more of the features described herein, or as an alternative, further embodiments of the heat exchanger assemblies may include that each baffle comprising at least one pressure channel providing the fluid connection between a respective baffle and the water flow passage.

In addition to one or more of the features described herein, or as an alternative, further embodiments of the heat exchanger assemblies may include that the secondary layer is a first secondary layer and each baffle comprises a second secondary layer arranged between the first secondary layer and the back of the baffle frame.

In addition to one or more of the features described herein, or as an alternative, further embodiments of the heat exchanger assemblies may include a water tank and pump arranged to pump water through the water flow passage and generate a pressure different at an outlet of each of the baffles.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1:
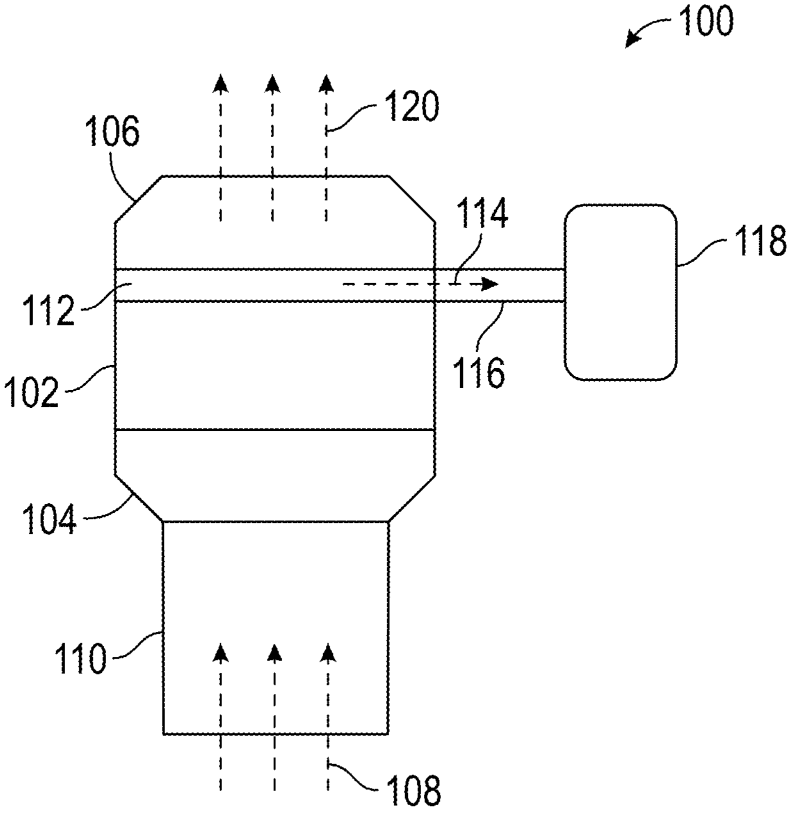
FIG. 1 is a schematic diagram of an environmental control system that may incorporate embodiments of the present disclosure.

As shown and described herein, various features of the disclosure will be presented. Various embodiments may have the same or similar features and thus the same or similar features may be labeled with similar reference numerals and/or description thereof may be omitted in certain later described embodiments for conciseness. Although similar reference numbers may be used in a generic sense, various embodiments will be described and various features may include changes, alterations, modifications, etc. as will be appreciated by those of skill in the art, whether explicitly described or otherwise would be appreciated by those of skill in the art. Further, it will be appreciated that, unless otherwise stated, features from the various separately described embodiments may be combined in various combinations and each embodiment is not intended to be mutually exclusive from features of other embodiments described herein and/or mutually exclusive from other features and components not explicitly described.

Referring to FIG. 1, illustrated is a schematic illustration of an environmental control system (ECS) 100 that may incorporate condensing heat exchangers in accordance with embodiments of the present disclosure. The ECS 100 may be installed on a spacecraft or the like and provide air circulation, air processing, moisture recapture, and the like, as will be appreciated by those of skill in the art. The ECS 100 includes a condensing heat exchanger 102 configured to extracting moisture from an airflow. The condensing heat exchanger 102 is arranged along a flow path of the ECS 100 and includes an inlet manifold 104 and an outlet manifold 106. As shown, input air 108 (e.g., humid air) may be directed along an inlet duct 110 or the like. The input air 108 may be sourced from an occupied space, such as a cabin of a craft or living/working quarters on a station. The input air 108 may be moist or humid air that is exhaled from occupants of the occupied space, and thus contains exhaled gases and moisture. The input air 108 may be driving by a fan, blower, induced pressure differential, or the like, and driven in a flow direction that flows from the inlet manifold 104 to the outlet manifold 106. Although not shown, the ECS 100 may also include various additional components, such as scrubbers (e.g., for carbon dioxide), fans, additional heat exchangers, heaters, water separators, temperature and moisture sensors, valves and other flow control devices and mechanisms, controllers and other electronic devices and/or electromechanical devices, and the like, as will be appreciated by those of skill in the art.

As the input air 108 enters the inlet manifold 104 and is directed into the condensing heat exchanger 102, the air may be cooled by means of a secondary fluid passing through the condensing heat exchanger 102, such as a coolant or the like, as will be appreciated by those of skill in the art. The cooling of the air will cause moisture carried in the air to condense into droplets or the like. At a junction between the condensing heat exchanger 102 and the outlet manifold 106, arranged within the outlet manifold 106, or as part of an outlet portion of the condensing heat exchanger 102, is a collector 112. In conventional systems, the collector 112 may be arranged as a slurper bar with a hydrophilic coating and may require specific manufacturing techniques for the heat exchanger, such as brazing and welding of a plate/fin configuration. However, in accordance with embodiments of the present disclosure, the collector 112 is provided with a baffle configuration that may eliminate the need for coatings and may eliminate the manufacturing techniques of prior systems.

In accordance with some embodiments of the present disclosure, the collector 112 may be configured with a baffle arrangement, as shown and described herein, that collects moisture from the airflow, and directs moisture 114 (e.g., condensed water) it along a liquid path 116 to a water collection system 118. In some configurations, the water collection system 118 may be arranged as a holding tank for holding water for use onboard a spacecraft or the like. In other configurations, the water collection system 118 may be arranged to pass the water through the heat exchanger 102 to provide a cooling fluid for the condensing of moisture from the air. In still other configurations, the water collection system 118 may be part of another system or the like, such as, and without limitation, a waste-water system, a drinking water system, or a coolant system for other onboard systems. With the moisture 114 removed from the airflow, dry air 120 may be directed into, through, and out of the outlet manifold 106 and passed to downstream systems which may further treat the dry air 120 and/or such dry air may be supplied back into the occupied space or used for other purposes, as will be appreciated by those of skill in the art.

As noted above, in accordance with embodiments of the present disclosure, a baffle arrangement is provided at the outlet of the condensing heat exchanger. In accordance with some embodiments of the present disclosure, arranging a baffle assembly separate from the condensing heat exchanger allows for decoupling of the condensate collection mechanism from the core of the condensing heat exchanger, and thus can eliminate brazement/weldment and/or eliminate coatings associated therewith. In accordance with some embodiments of the present disclosure, a baffle assembly operates by using a combination of capillary wicking in multilayer woven wire screens along with a low pressure interface from a pumped water loop that is fluidly coupled to the baffle assembly. In operation of such a system, for example, condensate droplets will exit a core of the condensing heat exchanger and be carried on the airflow through the core. These condensate droplets will impinge on a surfaces of the baffles of the baffle assembly. In some non-limiting embodiments, a hexagonally patterned capture plate is provided on the baffle, which forces larger droplets to break up into volumes of substantially equal size. The condensate then is pulled into a screen wick of the baffle. The wires of the screen wick may be oriented to an outlet end of the baffle that is coupled to the pumped water loop.

In some configurations, the baffle may be substantially tapered or triangular-shaped with a narrow end proximate the outlet that couples to the pumped water loop. This geometry may be employed because when the baffle is partially filled with water (e.g., collected condensate), the water will collect in interior corners, and may stagnate and/or not be extracted. The tapered configuration may aid in directing the liquid through the baffle to be collected by the pumped water loop. To provide the coupling between the baffle and the pumped water loop, an outlet end of the baffle may include mini channels or the like, and/or a coupling element may include such channel. The channels at the junction between the baffle and the pumped water loop provide an interface for a flowthrough passage of the pumped water loop, where the incoming condensate can enter and combine with the water of the pumped water loop, and thus extracted from the airflow. Accordingly, embodiments of the present disclosure are directed to condensate collection for use with condensing heat exchangers that provide improvements over prior systems, such as, for example, improving moisture collection and capture, improving component life, eliminating intensive manufacturing techniques, and the like.

Figure 2:
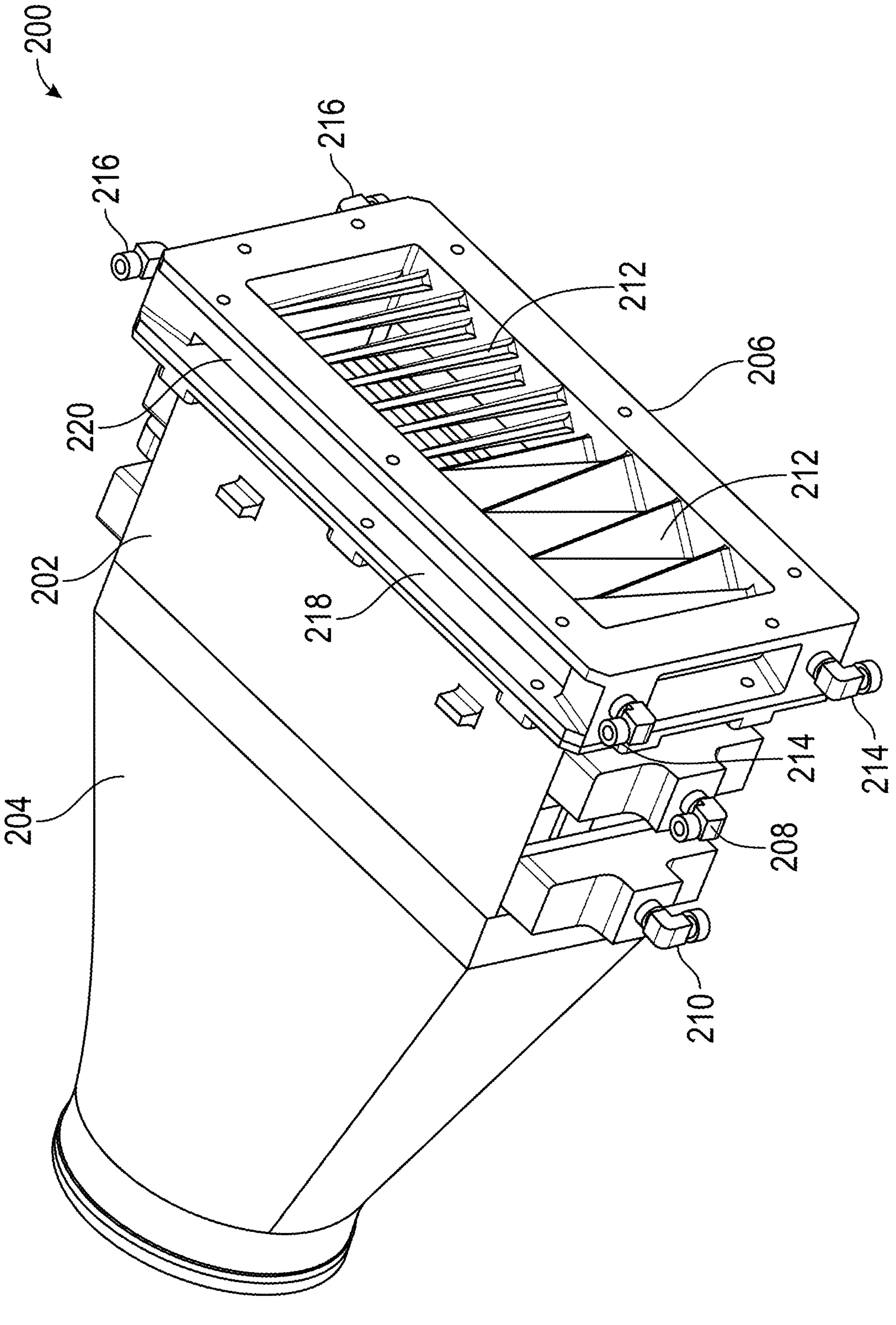
FIG. 2 is a schematic illustration of a heat exchanger assembly in accordance with an embodiment of the present disclosure.

Referring now to FIG. 2, a schematic illustration of a heat exchanger assembly 200 for use in an environmental control system or the like is shown. The heat exchanger assembly 200 includes a condensing heat exchanger 202 arranged between an inlet manifold 204 at an inlet of the condensing heat exchanger 202 and a baffle assembly 206 at an outlet of the condensing heat exchanger 202. The condensing heat exchanger 202 may be a two-fluid heat exchanger that receives a first working fluid through the inlet manifold 204. The first working fluid may be moist or humid air that is provided from an occupied space, such as a cabin, living quarters, or the like onboard a spacecraft or as part of a station or the like. The first working fluid is directed through a set or series of internal flow passages within the condensing heat exchanger 202. A second working fluid of the condensing heat exchanger 202 may be a coolant (e.g., refrigerant, water, or the like) that is passed through a second set or series of internal flow passages within the condensing heat exchanger 202. The internal flow passages of the first working fluid and the second working fluid may be arranged to prevent fluid mixing but provides for a mechanism of thermal exchange between the two working fluids. The first working fluid may exit the condensing heat exchanger 202 through the baffle assembly 206 and the second working fluid may be passed through an open-loop or closed-loop cycle. Accordingly, in this illustrative configuration, the condensing heat exchanger 202 includes a second working fluid inlet 208 and a second working fluid outlet 210. It will be appreciated that the second working fluid inlet 208 and the second working fluid outlet 210 may have other arrangements than that illustrated, and may, in some configurations, have multiple inlets and outlets, depending on the configuration of the condensing heat exchanger 202.

The baffle assembly 206 is arranged to provide a mechanism for collecting and capturing water droplets and condensate that is generated as the airflow passes form the inlet manifold 204 and through the condensing heat exchanger 202. The baffle assembly 206 includes at least one set of baffles 212 that are arranged at an outlet of the condensing heat exchanger 202 and arranged to interact with a flow of air that is exiting the condensing heat exchanger 202. The baffles 212 include an impingement side or surface that is oriented toward the airflow, and thus the airflow will impinge upon the impingement side or surface and water droplets that are formed by the cooled air will be collected on the impingement side or surface of the baffles 212. The baffles 212 are arranged to fluidly couple with a pumped water loop, which in this illustrative configuration includes a set of water loop inlets 214 and a set of water loop outlets 216. The baffles 212 may be supported within a housing 218 of the baffle assembly 206, and a water flow path 220 of the pumped water loop may be arranged within portions of the housing 218 of the baffle assembly 206.

In operation, a flow of water may be pumped into the water loop inlets 214, directed to flow along respective water flow paths 220, and to exit through the water loop outlets 216. As the pumped water flows through the water flow paths 220, it will create a pressure differential at an outlet of the baffles 212 and thus provide a motive force for drawing water that is impinged upon and collected by the impingement side or surface of the baffles 212. As a result, the airflow that exits the baffle assembly 206 will be dry air that has had the moisture removed therefrom, and the extracted water may be reclaimed for use in other systems and/or for consumption by occupants of a spacecraft or station.

Figure 3:
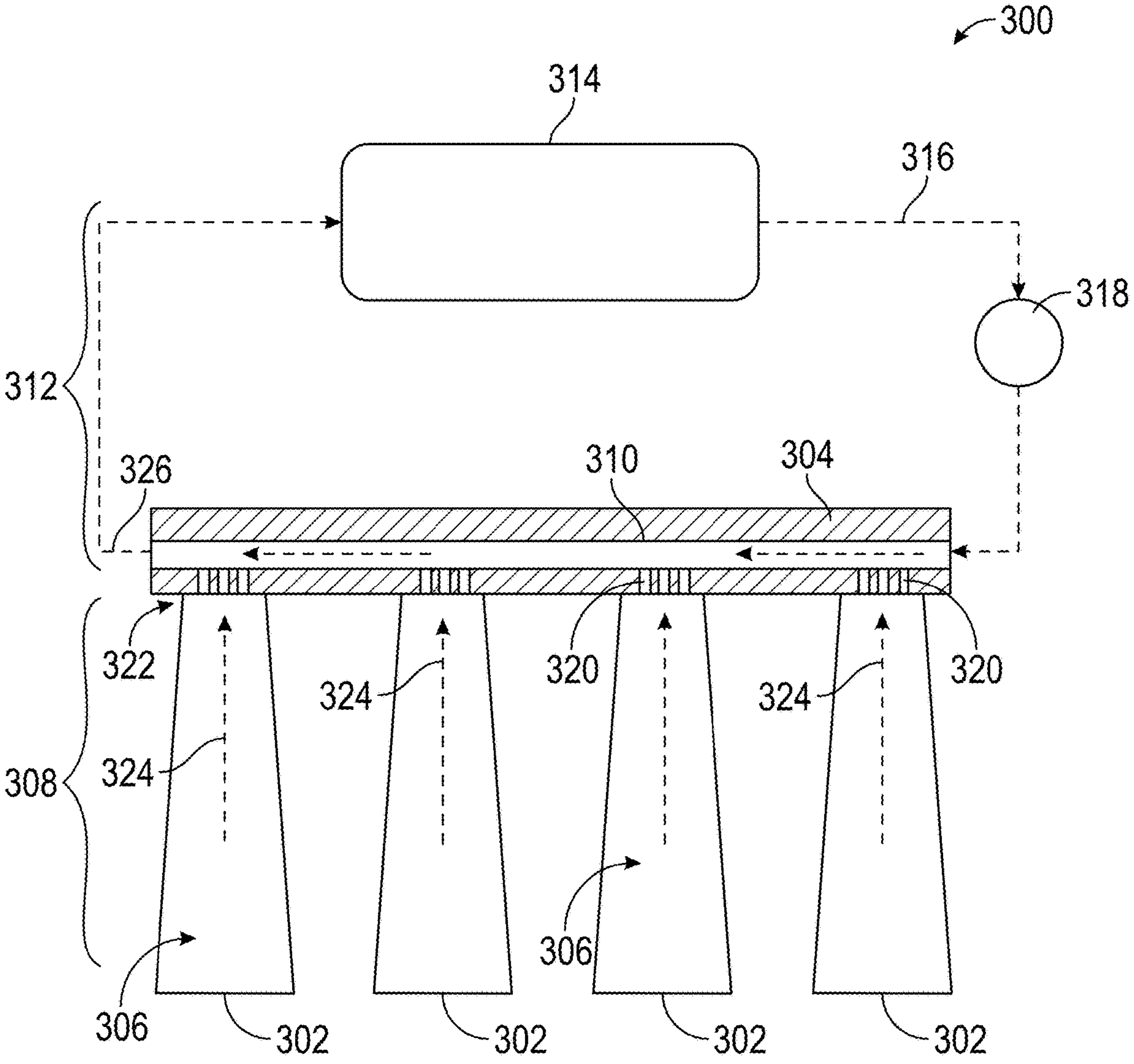
FIG. 3 is a schematic illustration of a baffle assembly in accordance with an embodiment of the present disclosure.

Referring now to FIG. 3, a schematic diagram of a portion of a baffle assembly 300 in accordance with an embodiment of the present disclosure is shown. The baffle assembly 300 may be arranged similar to that shown and described with respect to FIG. 2 and may be incorporated into a system as shown in FIG. 1. For example, the baffle assembly 300 may be arranged at an outlet side of a condensing heat exchanger of an environmental control system. The baffle assembly 300 includes a set of baffles 302 that are mounted to a housing 304. The baffles 302 are arranged at an outlet of a condensing heat exchanger in an orientation such that incoming airflow will impinge upon a collection assembly 306 of the baffles 302. As the airflow impinges upon and interacts with the collection assembly 306 of the baffles 302, water droplets will be collected by the baffles 302. The baffles 302 define a water collection portion 308 of the baffle assembly 300. The housing 304 includes a water flow passage 310 defined therein. The water flow passage 310 is part of a pumped water loop 312.

The pumped water loop 312 is a system that is arranged to extract water from the baffles 302 and, in this configuration, store the water in a water tank 314. As shown, water in the water tank 314 may flow along a flow path 316 and may be driven by a pump 318 or the like. The water will be pumped into and through the water flow passage 310 in the housing 304 and then cycled back to the water tank 314. The baffles 302 are each fluidly coupled to the water flow passage 310 by one or more pressure channels 320 at an outlet end 322 of the baffles 302. The pressure channels 320 are mini or micro channels that are configured to fluidly couple a portion of the baffles 302, as described herein, with the water flow passage 310.

As shown, the pump 318 may pump water 316 from the water tank 314 into the water flow passage 310. As the water 316 enters and flows through the water flow passage 310 it will interact with the pressure channels 320 and cause a pressure differential (e.g., low pressure) as it passes over and by the pressure channels 320. As a result, a low pressure zone will be generated at the outlet end 322 of the baffles 302. This pressure differential will cause moisture 324 that is collected on the collection assembly 306 of the baffles 302 to flow from the collection assembly 306 toward and through the pressure channels 320. The collected moisture 324 will mix with the water 316 within the water flow passage 310 and the combined water 326 will be returned to the water tank 314. Accordingly, the baffle assembly 300 is arranged to extract water from an airflow that impinges upon the baffles 302 and thus generate dry air that may be conveyed downstream for other purposes (e.g., directed back into an occupied space).

Figure 4:
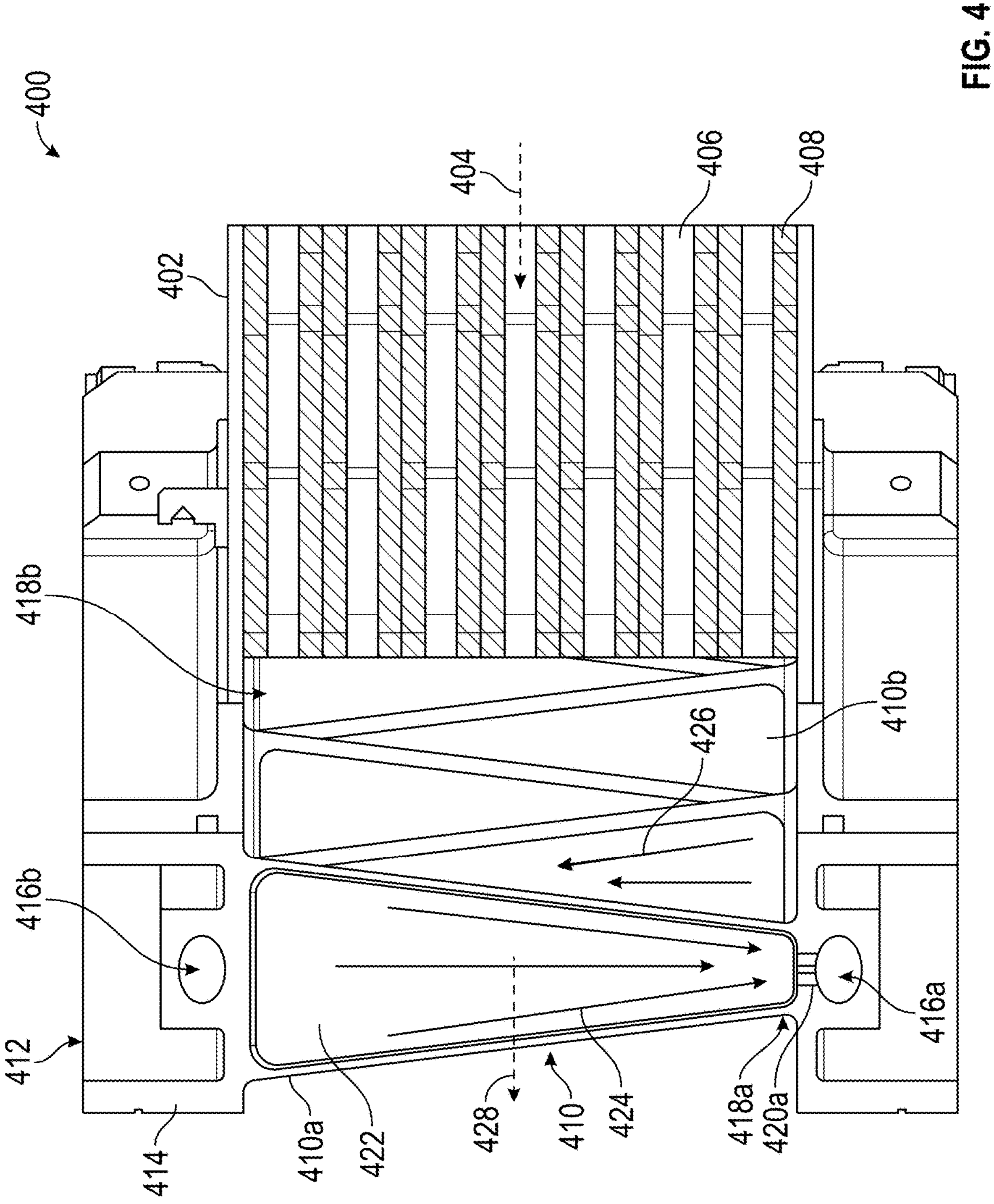
FIG. 4 is a schematic illustration of parts of a heat exchanger assembly in accordance with an embodiment of the present disclosure.

Referring now to FIG. 4, a schematic illustration of a portion of a heat exchanger assembly 400 in accordance with an embodiment of the present disclosure is shown. The heat exchanger assembly 400 may be configuration within systems as shown and described above. The heat exchanger assembly 400 includes a heat exchanger core 402 that is arranged to receive a first working fluid 404 through a first set of internal flow passages 406. A second working fluid (not shown) may be conveyed through a second set of internal flow passages 408 of the heat exchanger core 402. The first working fluid 404 may be air of an environmental control system or may be directly or indirectly obtained from an occupied space. As such, the first working fluid 404 may be moist or humid air that is exhaled from occupants of the occupied space. In FIG. 4, the first working fluid 404 travels from right to left on the page, with an inlet to the first set of internal flow passages 406 being to the right on the page. The second working fluid may be a coolant, refrigerant, or other fluid selected or conditioned to have a temperature less than that of the first working fluid 404 and thus may extract heat from the first working fluid 404 and cause the formation of water droplets within the first working fluid 404.

As the first working fluid 404 exits the heat exchanger core 402, the air carrying the water droplets will impinge upon baffles 410 of a baffle assembly 412. The baffle assembly 412 includes two sets of baffles 410, including first baffles 410*a* and second baffles 410*b*. The first baffles 410*a* are arranged in a first orientation or direction and the second baffles 410*b* are arranged in a second orientation or direction, which may be opposite the direction of the first baffles 410*a*. The baffles assembly 412 has a housing 414 and the baffles 410 extend between portions of the housing 414. As noted above, the housing 414 may incorporate features of a pumped water loop. As shown, the housing 414 includes a first water flow passage 416*a* and a second water flow passage 416*b* arranged at outlet ends 418*a*, 418*b* of the baffles 410*a*, 410*b*, respectively. The first baffles 410*a* may be fluidly coupled to the first water flow passage 416*a* at an outlet end 418*a* of the first baffles 410*a*. Similarly, the second baffles 410*b* may be fluidly coupled to the second water flow passage 416*b* at an outlet end 418*b* of the second baffles 410*b*. A fluid connection between internal structures of the baffles 410*a*, 410*b* and the respective water flow passages 416*a*, 416*b*, may be provided by one or more pressure channels, respectively, within only the pressure channels 420*a* illustrated in this view.

Each baffle 410 includes a baffle insert 422. The baffle insert 422 of each baffle 410 may be configured as a layered structure with mesh wires arranged to break up water droplets and to aid in capture, retention, and directing of water through the structure of the baffle insert 422 toward the pressure channels. The directing of the water to the pressure channels may be induced by a pumped or pressurized water flow through the water flow passages 416*a*, 416*b*. As shown in FIG. 4, collected water 424 may be directed through the baffle insert 422 of the first baffle 410*a* toward the first water flow passage 416*a* through the pressure channels 420*a*. Similarly, collected water 426 captured by the second baffles 410*b* may be directed through respective baffle inserts of the second baffles 410*b* and through respective pressure channels to the second water flow passage 416*b*. As a result, condensed water droplets may be removed from the first working fluid 404, and dry air 428 may exit the heat exchanger assembly 400.

Figure 5:
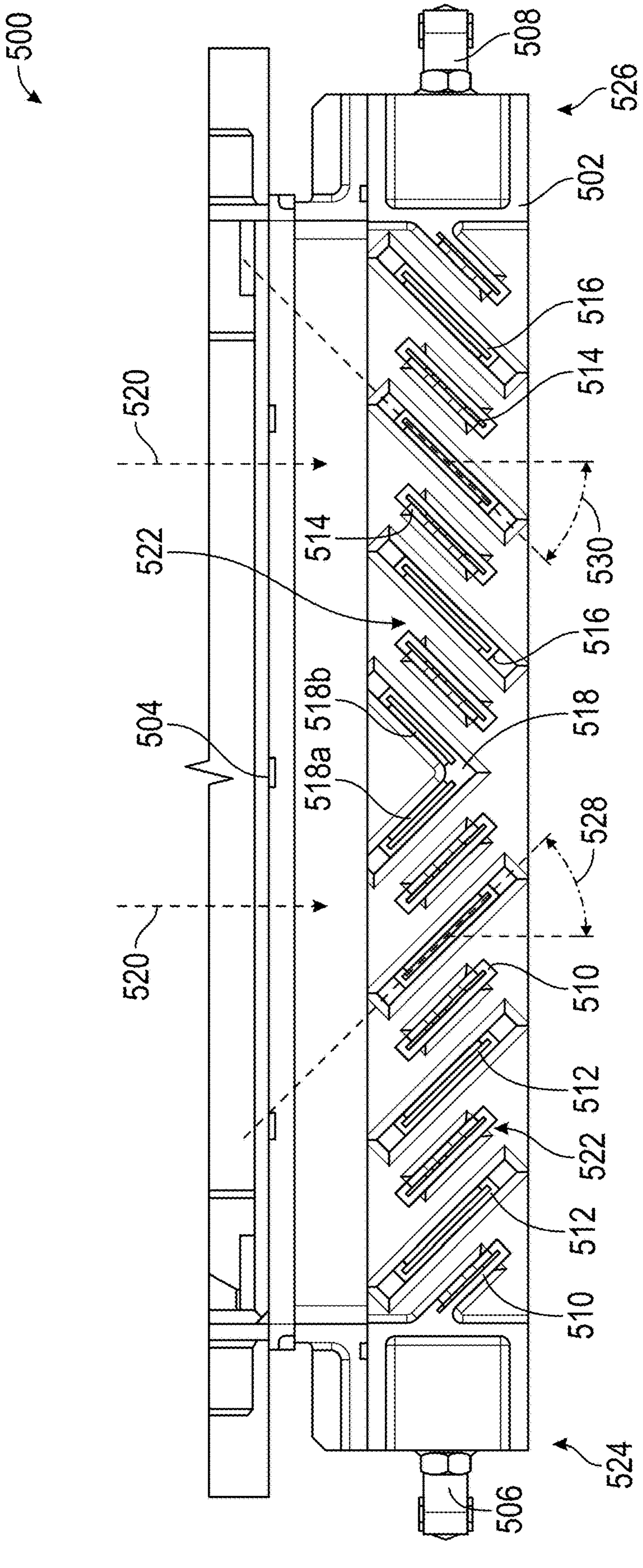
FIG. 5 is a schematic illustration of a baffle assembly in accordance with an embodiment of the present disclosure.

Referring now to FIG. 5, a schematic illustration of part of a baffle assembly 500 in accordance with an embodiment of the present disclosure is shown. The baffle assembly 500 may include a housing 502 that is arranged at an outlet of a heat exchanger core 504. The baffle assembly 500 may be arranged similar to that shown and described above. The housing 502 of the baffle assembly 500 may include a water flow passage that extends between a water inlet 506 and a water outlet 508, and may be configured similar to that shown and described above. Fluidly coupled to the water flow passage are baffles elements. In this illustrative configuration, the baffle assembly 500 includes first baffle elements 510, second baffle elements 512, third baffle elements 514, fourth baffle elements 516, and fifth baffle elements 518. The baffle elements 510, 512, 514, 516, 518 may have structures as shown and described herein. The illustrated portions shown in FIG. 5 are cross-sections of the respective baffles, which are mounted to or otherwise attached or part of the housing 502 of the baffle assembly 500. Each baffle element 510, 512, 514, 516, 518 may include one or more baffles, as described herein.

The first baffle elements 510, the third baffle elements 514, and the fifth baffle elements 518 may be fluidly coupled to the water flow passage having the water inlet 506 and water outlet 508 in the portion of the housing 502 illustrated in FIG. 5. The second baffle elements 512 and the fourth baffle elements 516 may be fluidly coupled to a second water flow passage arranged through another portion of the housing 502 (e.g., as shown in FIG. 4). In this illustration, a narrow portion of the first, third, and fifth baffle elements 510, 514, 518 are illustrated and indicative of a narrowing or tapering end of the respective baffle elements 510, 514, 518. The narrow portion is at the outlet end of the baffle elements 510, 514, 518 to provide for a funneling of water through the baffle elements 510, 514, 518 and into the water flow passage that is induced by a low pressure in the water flow passage. A wide portion of the second and fourth baffle elements 512, 516 is shown, with the narrow portion thereof being proximate the second water flow passage that is not shown.

As shown, the baffle elements 510, 512, 514, 516, 518 are arranged such that incident air flowing in an airflow direction 520 will exit the heat exchanger core 504 an impinge upon the baffle elements 510, 512, 514, 516, 518. Gaps 522 are provided between adjacent baffle elements 510, 512, 514, 516, 518 to permit airflow to pass through the baffle assembly 500. However, because the baffle elements 510, 512, 514, 516, 518 are arranged at an angle relative to the airflow direction 520, moisture within the airflow will interact with the baffle elements 510, 512, 514, 516, 518 and extracted or collected from the airflow, resulting in dry air leaving the baffle assemble 500.

In this illustrative configuration, the baffle elements 510, 512, 514, 516 are arranged in an alternating pattern arrange opposite sides of a central baffle element 518. The first baffle elements 510 and the second baffle elements 512 are arranged in an alternating arrangement in a direction from a first end 524 of the housing 502 toward a second end 526 of the housing 502 with gaps 522 provided between adjacent baffle elements 510, 512. The set of first and second baffle elements 510, 512 extend from the first end 524 to the central baffle element 518. In the same direction (from the first end 524 toward the second end 526), the third baffle elements 514 and the fourth baffle elements 516 are arranged in an alternating pattern that spans from the central baffle element 518 to the second end 526. As shown, the first and second baffle elements 510, 512 are arranged at a first angle 528 relative to the airflow direction 520 and the third and fourth baffle elements 514, 516 are arranged at a second angle 530 relative to the airflow direction 520. The first angle 528 and the second angle 530 may be equal and opposite, relative to the airflow direction 520. Each of the first, second, third, and fourth baffle elements 510, 512, 514, 516 are provided with one baffle. In contrast, the fifth baffle element 518 is formed of two baffles 518*a*, 518*b*. As shown, a first baffle 518*a* of the fifth baffle element 518 is oriented at the first angle 528 and the second baffle 518*b* is orientated at the second angle 530, relative to the airflow direction 520. In this configuration, the baffles 518*a*, 518*b* are similar to the first and third baffle elements 510, 514, and may be fluidly coupled to the same water flow passage as the first and third baffle elements 510, 514. The angles of the baffles may be selected to ensure sufficient impingement of air to collect moisture therefrom, while allowing dry air to continue through the baffle assembly 500. In accordance with some embodiments, the angle of the baffles, with respect to a flow direction may be between 20 and 70 degrees, or between 30 and 60 degrees, although smaller or larger angles are possible without departing from the scope of the present disclosure.

Although shown in FIG. 5 with different oriented baffles and baffle elements, arranged about a central baffle element, such configuration is not intended to be limiting. In other configurations, all baffles and baffle elements may be arranged at the same angle and in the same direction. However, it will be appreciated that the illustrative chevron-like orientation of these features may aid in directing a dry air outflow to merge and flow in a desired direction. In other configurations, however, it may be advantageous to direct the outflowing dry air at a particular angle, and thus the baffles and/or baffle elements may be arranged and oriented to achieve such desired flow direction. It will be appreciated that the first and second angles 528, 530 may be set to ensure that all airflow exiting the heat exchanger core 504 will impinge upon a surface of at least one baffle or baffle element. As such, all moisture within the airflow may be captured therefrom and dry air will be generated, with the water from the air being collected by the baffles/baffle elements and drawn into and combined with water flowing through the water flow passage(s) in the housing.

Figure 6A:
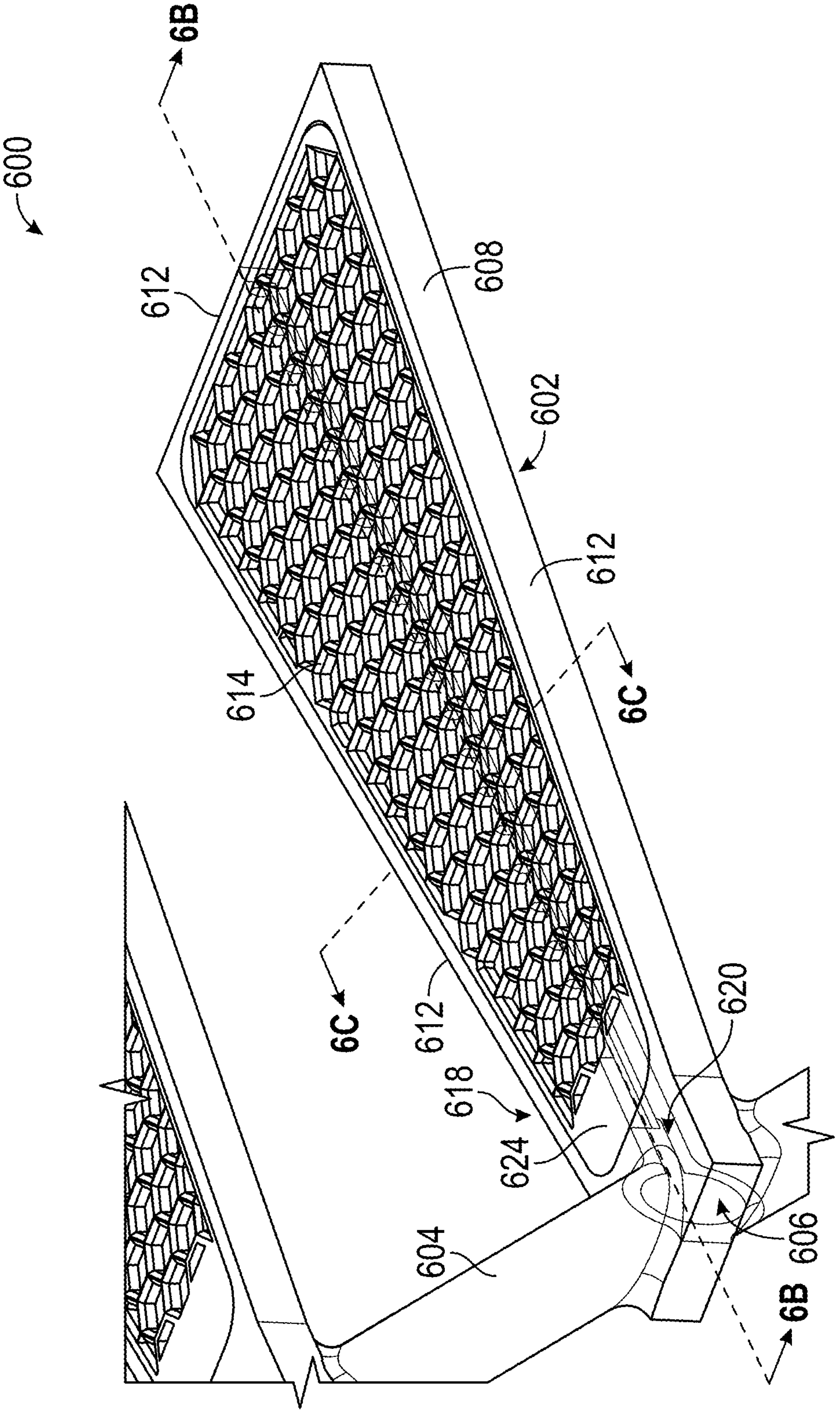
FIG. 6A is a schematic illustration of a portion of a baffle assembly in accordance with an embodiment of the present disclosure.
Figure 6B:
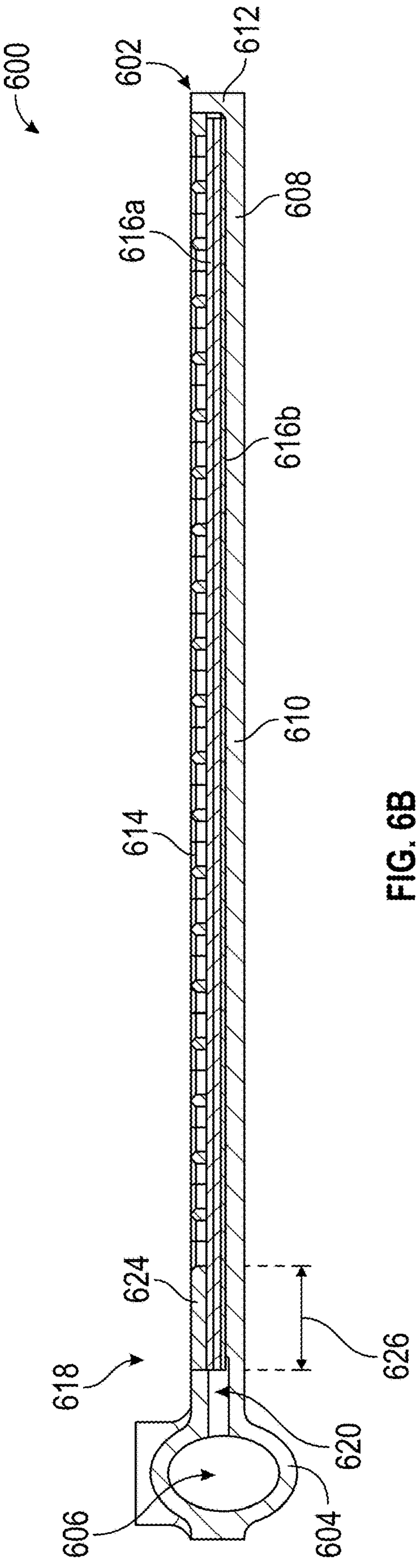
FIG. 6B is a cross-sectional illustration of a baffle of the baffle assembly of FIG. 6A.
Figure 6C:
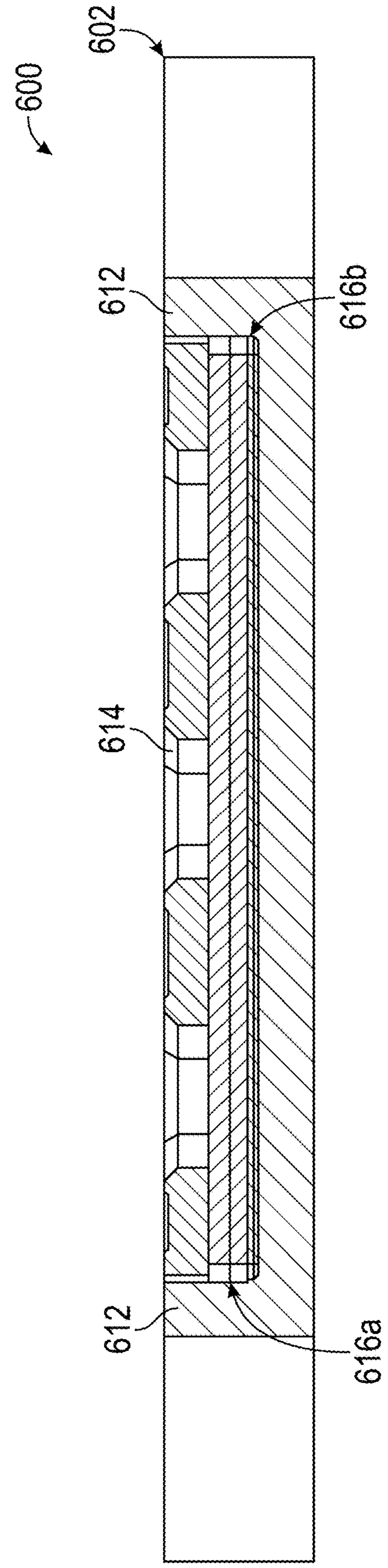
FIG. 6C is another cross-sectional illustration of the baffle of FIGS. 6A-6B.

Referring now to FIGS. 6A-6C, schematic illustrations of a portion of a baffle assembly 600 in accordance with an embodiment of the present disclosure are shown. FIG. 6A illustrates a baffle 602 (or baffle element) extending from a portion of a housing 604 that defines a water flow passage 606 therein, and FIGS. 6B-6C illustrate cross-sectional views thereof. The baffle 602 may represent one baffle or part of a baffle element, as shown and described above. The baffle 602 includes a baffle frame 608 that is configured to connect to, attach to, interface with, or extend from the housing 604. The baffle frame 608 supports a layered configuration or layered structure that is designed to capture, collect, and direct liquid water from an airflow incident to and impinging on the baffle 602 to the water flow passage 606.

The baffle frame 608 has a solid back 610 and solid sidewalls 612 that define an open faced cavity therein. The cavity is filled with a water capture assembly that is a layered structure arranged to capture liquid water and direct the captured liquid water to the water flow passage 606. The baffle 602 includes at least one primary layer 614 and at least one secondary layer 616 (illustrated with two first secondary layers 616*a* and two second secondary layers 616*b*). The primary layer 614 defines an exterior layer of the layered structure, and the secondary layers 616 are sandwiched between the primary layer 614 and the back 610 of the baffle frame 608. The periphery of the layered structure is contained by the sidewalls 612 of the baffle frame 608. The primary layer 614 may be a matrix-like structure, and in this configuration is formed of a hexagonal pattern. Each hexagon shape of the primary layer 614 has an open center that is exposed to the secondary layer(s) 616 (and in this configuration the top-most first secondary layer 616*a*). Although shown and described as hexagons, the geometry of the openings may be set as any geometric shape, such as triangular, square, hexagon, or other polygonal shape.

The structure of the primary layer 614 and the shape and size of the pattern is selected to ensure that water droplets that impact the primary layer 614 are broken into smaller droplets to ensure a desired droplet size that will, at most, fill the open portion of the pattern of the primary layer 614. The water will then be captured by the surfaces of the primary layer 614 and the first secondary layer(s) 616*a* that is beneath the primary layer 614. The water or portion thereof may then be absorbed into the second secondary layer(s) 616*b*. Once the water is contained within the secondary layer(s) 616, a pressure differential that is generated at an outlet end 618 of the baffle 602 within the water flow passage 606 will cause the water to flow through the secondary layer(s) 616 and to enter the water flow passage 606.

The baffle 602 has a tapering geometry. That is, a dimension of the baffle 602 at the outlet end 618 is narrower than an end of the baffle 602 opposite the outlet end 618. In some configurations, the baffle 602 may have a triangular or trapezoidal shape, with a narrow end of the geometry coupling to the housing 604. This tapering shape provides a geometry that aids in the capture, collection, and directing of collected water from the layered assembly of the baffle 602 to the water flow passage 606. As noted above, a motive force to draw the water from the layered assembly to the water flow passage 606 may be provided by pumping water through the water flow passage 606. As the water flows through the water flow passage 606 it will pass pressure channels 620 at the outlet end 618 of the baffle 602 and at the junction between the baffle 602 and the housing 604. The flowing water generates a pressure differential with a low pressure being induced at the pressure channels 620. The low pressure will cause water captured within the layer assembly, and particularly the secondary layers 616*a*, 616*b*, to flow toward the outlet end 618 of the baffle 602.

To ensure the pressure differential at the outlet end 618 of the baffle 602 is maintained, the baffle 602 may include a cover 624 at the outlet end 618 of the primary layer 614. That is, the pattern of openings in the primary layer 614 may stop and transition to the solid cover 624 at the outlet end 618 such that the secondary layer(s) 616 extend closer to the water flow passage 606 than the patterned portion of the primary layer 614. As a result, the secondary layer(s) 616 may fluidly connect to the pressure channels 620, which in turn fluidly connect to the water flow passage 606. The length of the cover 624 may be selected to minimize the amount of blockage, and thus maximize the amount of center openings within the pattern of the primary layer 614 while maximizing the impact of the pressure differential generated within and at the pressure channels 620. Accordingly, the cover 624 may have a length 626 that is selected based on these considerations. Although shown with the cover 624 being integrally formed and part of the primary layer 614, it will be appreciated that in other embodiments the cover may be a separate component or structure applied at the outlet end 618 of the baffle 602 to enclose a portion of the layers 614, 616*a*, 616*b* and provide the same functionality as an integral cover.

Figure 7A:
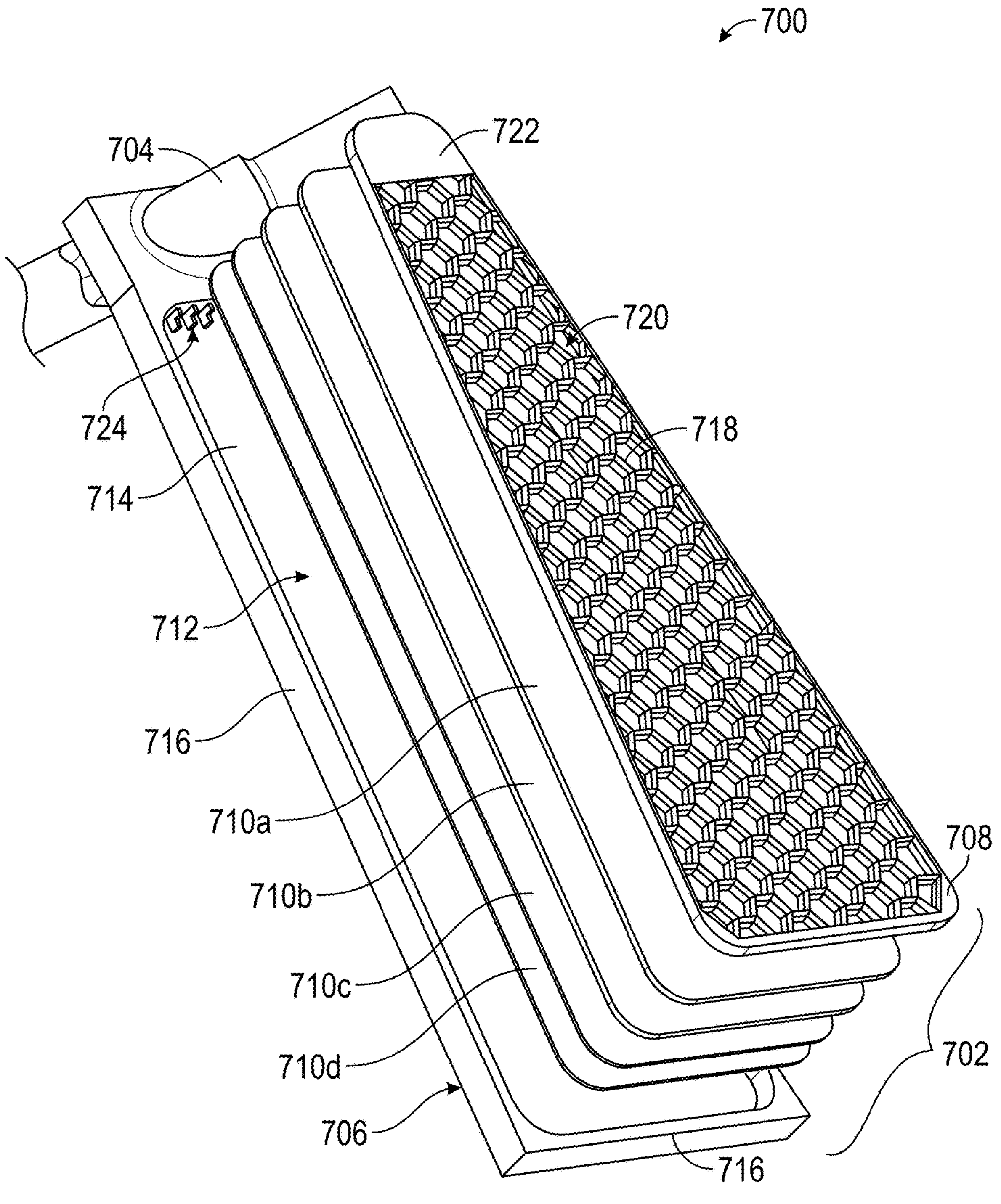
FIG. 7A is a schematic illustration of a baffle in accordance with an embodiment of the present disclosure.
Figure 7B:
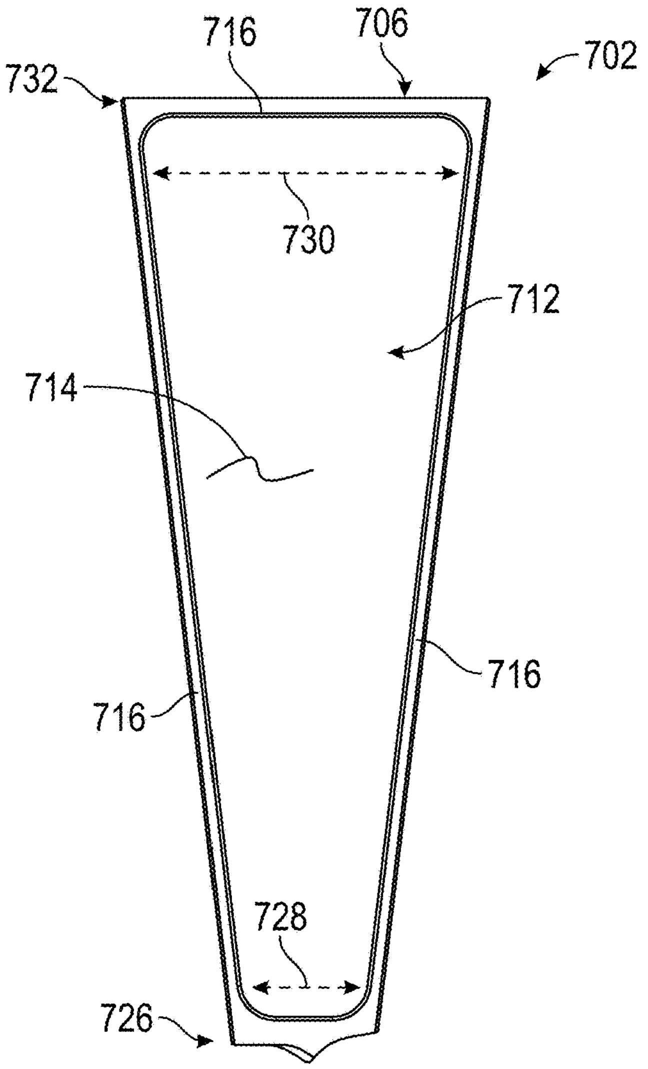
FIG. 7B is a plan view of a baffle frame of the baffle of FIG. 7A.
Figure 7C:
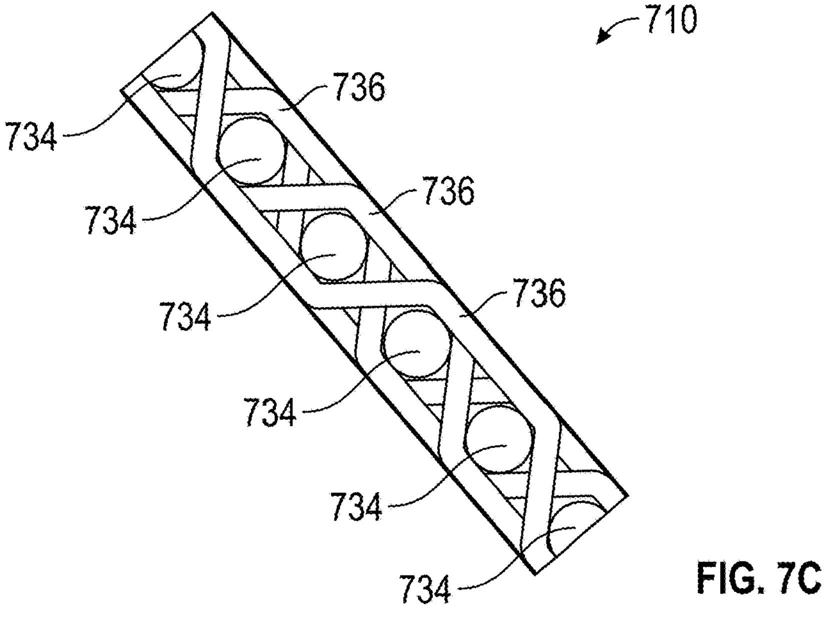
FIG. 7C is a detailed illustration of an example of a portion of a secondary layer of the baffle of FIG. 7A in accordance with an embodiment of the present disclosure.

Referring now to FIGS. 7A-7C, schematic illustrations of a portion of a baffle assembly 700 in accordance with an embodiment of the present disclosure are shown. FIG. 7A illustrates a baffle 702 (or baffle element) extending from a portion of a housing 704 that defines a water flow passage therein. The baffle 702 shown in FIG. 7A is illustrated in an exploded or separated view to illustrate the features thereof. The baffle 702 may represent one baffle or part of a baffle element, as shown and described above. The baffle 702 includes a baffle frame 706 that is configured to connect to, attach to, interface with, or extend from the housing 704. The baffle frame 706 supports a layered configuration or layered assembly that is designed to capture, collect, and direct liquid water from an airflow incident to and impinging on the baffle 702 to the water flow passage within the housing 704. FIG. 7B illustrates a plan view of the baffle frame 708 and FIG. 7C illustrates a cross-sectional illustration of a portion of a secondary layer 710 of the baffle 702.

As shown in FIG. 7A, the layered structure of the baffle 702 includes a primary layer 708 with multiple secondary layers 710 (illustrated as secondary layers 710*a-d*) that are arranged within an open faced baffle cavity 712 defined by the baffle frame 706. The open faced baffle cavity 712 is defined by a solid back 714 and solid sidewalls 716, similar to that shown and described above. The primary layer 708 includes a geometric grid structure 718 with openings 720 defined within the grid structure 718. The primary layer 708 is tapered with a narrow end thereof proximate the housing 704. At the narrow end of the primary layer 708 is a cover 722 that is solid and does include any openings 720. The secondary layers 710 are sandwiched between the primary layer 708 and the back 714 of the baffle frame 706. In this illustrative configuration, the secondary layers 710 includes a first secondary layer 710*a*, a second secondary layer 710*b*, a third secondary layer 710*c*, and a fourth secondary layer 710*d*. Each of the secondary layers 710 may be arranged as a wire mesh material with gaps and spaces between wires of the respective wire meshes that provide a tortuous path for liquid water to travel as a pressure differential is induced at pressure channels 724 of the baffle 702. The pressure channels 724 are fluid paths that fluidly connect the baffle cavity 712 to an internal water flow passage within the housing 704. The cover 722 provides a solid portion of the primary layer 708 to ensure that the pressure differential may be exposed to the various secondary layers 710 and induce the water to flow from the secondary layers 710 into the water flow passage.

FIG. 7B illustrates the tapered geometry of the baffle 702. Although FIG. 7B illustrates the baffle frame 706, the geometry of the baffle 702 is defined by the frame, and thus the additional elements (e.g., layers) are not shown in FIG. 7B. The baffle 702 has an outlet end 726 that includes the pressure channels 724 and may be connected to the housing 704, as shown in FIG. 7A. The outlet end 726 has a width 728 that is less than a width 730 at an end 732 of the baffle 702 opposite the outlet end 726. As such, the baffle 702 has a tapered geometry. At least a portion of the outlet end 726 is covered by the cover 722 of the primary layer 708.

FIG. 7C illustrates a detailed illustration of a structure of a secondary layer 710 of the present disclosure. As shown, the secondary layer 710 is formed of a wire mesh configuration having a first set of wires 734 and a second set of wires 736. The two sets of wires 734, 736 are arranged such that the first set of the wires 734 extends in a direction from end 732 to end 728 (e.g., a lengthwise direction of the baffle 702) within the baffle 702 and the second set of wires 736 extends in a direction normal to the first set of wires 734 (e.g., in a width direction of the baffle 702). The wires 734, 736 may be woven into a mesh weave (e.g., twill weave, Dutch weave, Dutch-twill weave, plain weave, etc.). The woven wires 734, 736 will result in small gaps and spaces between the wires, which define a fluid flow path through the respective secondary layers 710 for water to travel. The type of weave selected for the secondary layers 710 may be based on the ability to pull water through the respective secondary layers 710. In some embodiments, the different secondary layers 710, such as layers 710*a-d* shown in FIG. 7A, may be configured with different weave styles. For example, in some non-limiting embodiments, the first and second secondary layers 710*a*, 710*b* may have a more coarse or loose weave pattern with larger gaps between the wires thereof, and the third and fourth secondary layers 710*c*, 710*d* may have a smaller or tighter weave pattern with smaller gaps between the wires thereof. In other embodiments, the weave pattern may increasingly get smaller or tighter as the layers approach the back 714 of the baffle frame 706. Although shown with four secondary layers 710*a-d*, it will be appreciated that other configurations are possible without departing from the scope of the present disclosure. For example, in some embodiments, a single secondary layer may be employed, and in other embodiments, two or more secondary layers may be employed.

Figure 8A:
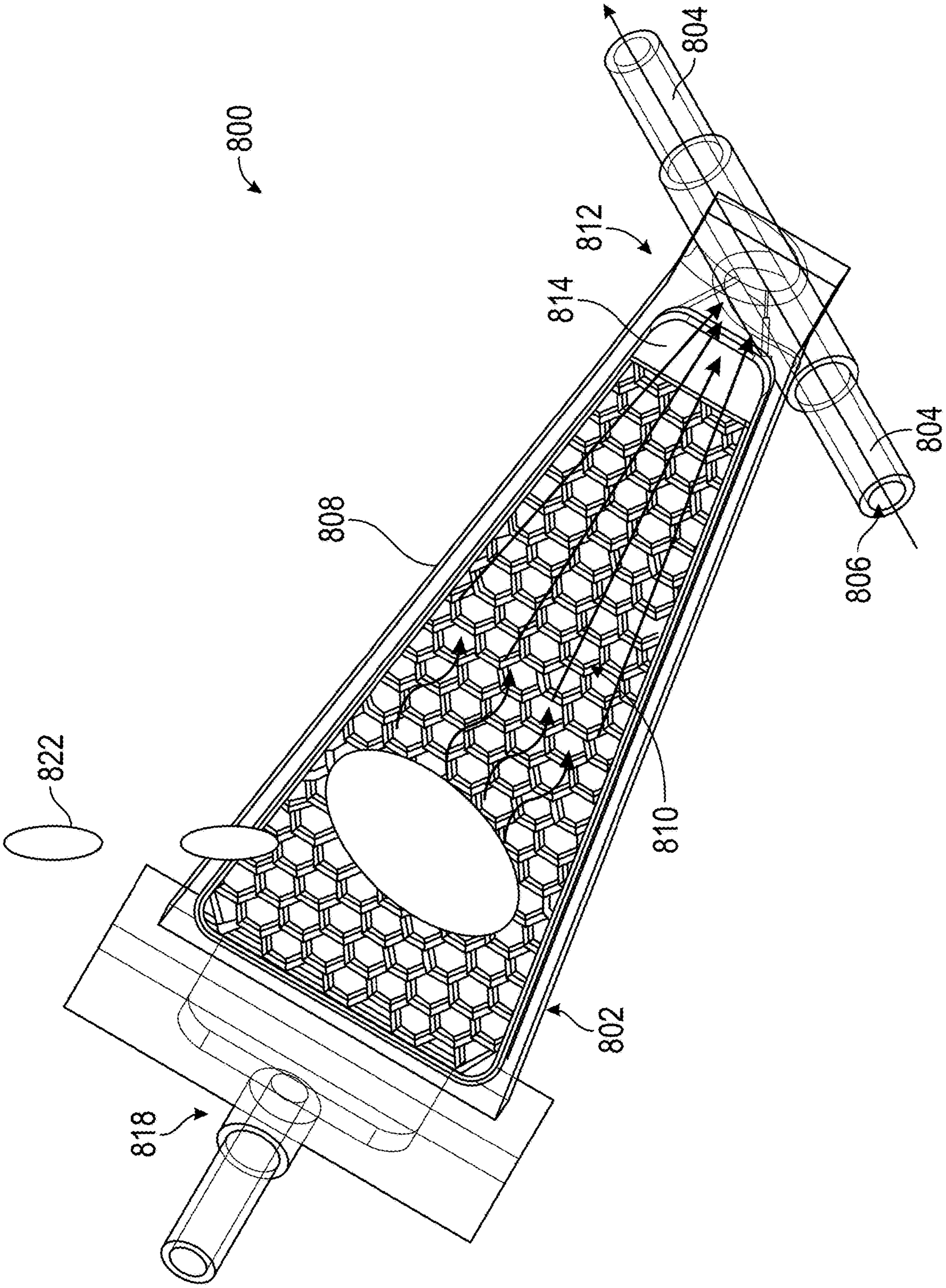
FIG. 8A is a schematic illustration of a portion of a baffle assembly in accordance with an embodiment of the present disclosure.
Figure 8B:
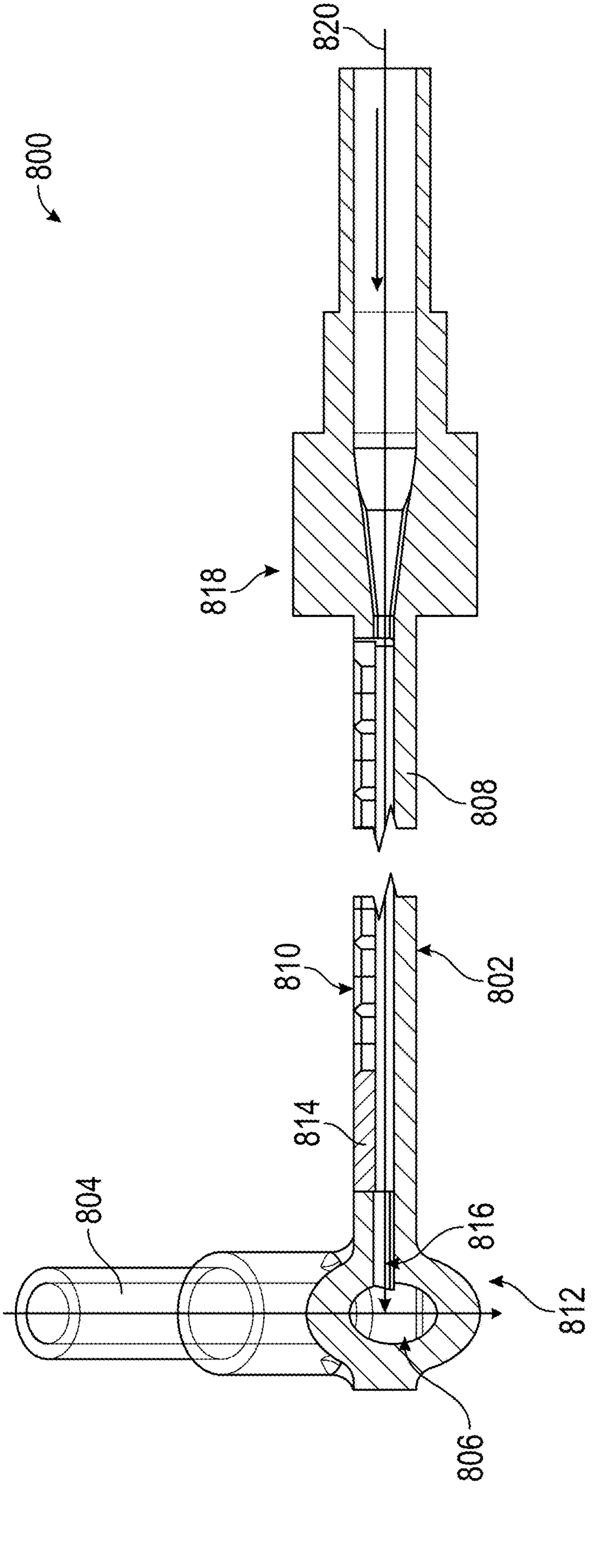
FIG. 8B is a partial cross-sectional illustration of the baffle assembly of FIG. 8A.

Referring now to FIGS. 8A-8B, schematic illustrations of a portion of a baffle assembly 800 in accordance with an embodiment of the present disclosure are shown. FIG. 8A illustrates a baffle 802 (or baffle element) extending from a portion of a housing 804 that defines a water flow passage 806 therein, and FIG. 8B illustrates a cross-sectional view thereof. The baffle 802 may represent one baffle or part of a baffle element, similar to that shown and described above. The baffle 802 includes a baffle frame 808 that is configured to connect to, attach to, interface with, or extend from the housing 804. The baffle frame 808 supports a layered assembly 810 or layered structure that is designed to capture, collect, and direct liquid water from an airflow incident to and impinging on the baffle 802 to the water flow passage 806. The layered assembly 810 may include one or more primary layers and one or more secondary layers, such as shown and described above. The primary layer of the layered assembly 810 may include a grid-like pattern that has openings sized to ensure droplet size and water capture, and the secondary layer(s) may be arranged to provide flow or wicking paths for liquid water flow to pass to the water flow passage 806.

In this configuration, an active mechanism for directing the collected water from the layered assembly 810 to the water flow passage 806 is provided. That is, in accordance with some embodiments of the present disclosure, the baffles and features thereof may be pre-wetted to encourage water collection and fluid flow. Similar to the above-described embodiments, at an outlet end 812 of the baffle 802, the baffle 802 may include a cover 814 that is part of a primary layer of the layered assembly 810. That is, the pattern of openings in the primary layer may stop and transition to the solid cover 814 at the outlet end 812 such that the secondary layer(s) extend closer to the water flow passage 806 than the patterned portion of the primary layer. As a result, the secondary layer(s) may fluidly connect to one or more pressure channels 816, which in turn fluidly connect to the water flow passage 806.

At an end of the baffle 802 opposite the outlet end 812, the baffle 802 includes a secondary water flow assembly 818. The secondary water flow assembly 818 is configured to direct a secondary flow 820 of water from the secondary water flow assembly 818 to the outlet end 812 and supply such secondary flow 820 of water, and any collected water that impinges upon the baffle 802, into the water flow passage 806. The secondary flow 820 provide from the secondary water flow assembly 818 may be set at subambient pressure, which may be the same pressure or a higher pressure than a pressure of water within the water flow passage 806. For example, subambient pressures may range from vacuum (e.g., 0 psi) to about 4.5 psi. The secondary water flow assembly 818 may provide a continuous secondary flow 820 of water through the baffle 802. In operation, droplets 822 of condensate impinge and accumulate on the surface of the baffle 802 (e.g., on the layered assembly 810). The primary layer (e.g., a honeycomb plate) captures the droplets 822 and decelerates them. The captured droplets 822 will then combine with the secondary flow 820 of water provided from the secondary water flow assembly 818 as it passes from the secondary water flow assembly 818 to the outlet end 812. As the captured droplets 822 combine with the second flow 820 from the secondary water flow assembly 818, a vacuum pressure may be generated or induced within the layered assembly 810. As such, the water will be pulled or directed to the water flow passage 806.

In some configurations, the water flow passage 806 and the secondary water flow assembly 818 may be arranged in series in a closed-loop configuration, such that at least a portion of the water within the water flow passage 806 is recycled or recirculated back to the secondary water flow assembly 818 and then passed through the baffle(s). In other embodiments, the water supplied into and through the secondary water flow assembly 818 may be provided from some other source onboard, such as a domestic water supply, water tank, dedicated water tank, and/or other systems that include a supply of water.

As shown and described above, passive or active water collection and flow inducement may be provided to remove collected water from a baffle. Further in some closed-end baffle configurations (e.g., FIGS. 2-7C), rather than using a water flow and/or in combination with a water flow, a vacuum pressure or negative pressure may be applied to the outlet end of the baffles. The negative pressures may be induced by a vacuum pump, suction side of a rotary separator, or the like, as will be appreciated by those of skill in the art. The negative pressure applied to the outlet end of the baffle (similar to the water flow passage) can pull condensate droplets through the screens and mesh material. In the case of an open-end baffle configuration (e.g., FIGS. 8A-8B), a continuous pumped loop of water may be provided such that the baffles are continuously supplied with a flow of moving water. As condensate impinges upon the baffle and is absorbed into the mesh layer(s), the condensate will combine with the flowing water to be drawn away from or out of the baffle and into the water flow passage.

In view of the above description, it will be appreciated that various configurations are possible without departing from the scope of the present disclosure. In some configurations, for example, the baffles of the baffle assemblies may be arranged in an alternating pattern such that the outlet ends thereof switch between adjacent baffles (e.g., as shown in FIGS. 2, 4, 5). However, in other embodiments, all baffles may be arranged with their outlet ends on the same side of the frame of the baffle assembly. In such embodiments, the frame may have only a single water flow passage therein, which coupled to each of the baffles. In some embodiments, the baffles may be arranged such that there is no direct flow path through the baffle assembly that does not impinge upon a baffle surface. Such a blockage of flow will ensure that the moisture or humidity carried by the incident air will be captured by the structure of the baffles. The primary and secondary layers of the baffles are provided to ensure a wicking of the water that is induced by a pressure differential at an outlet end of the baffles. This pressure differential is provided by a pumped water flow through a flow passage that the baffles are fluidly coupled to. The collected water will join the flow and enter a water tank or the like, for storage and/or use.

In operation, the baffles described herein operate by using a combination of capillary wicking in multilayer woven wire screens along with a low pressure interface from a pumped water loop. First, condensate droplets exit the core of the heat exchanger and impinge on a patterned capture plate (e.g., primary layer), which may have a hexagonal opening geometry, which forces larger droplets to break up into volumes of substantially equal size. The liquid droplets (e.g., condensate) are then pulled into the screen wick (e.g., secondary layers). The straight wires of the wick are oriented to the outlet of the baffle. The baffle is substantially triangular shaped because when it partially filled, the water will collect in the interior corners thereof. If a squared shape was employed, the water collected in the interior corners may not successfully be drawn into the water passage. The outlet ends of the baffles include mini channels that interface to the flow through passage of the pumped water loop where the incoming condensate combines with that flow.

In accordance with embodiments of the present disclosure, the baffles and associated components may be formed from various materials. For example, the baffle frame that support the primary and secondary layers may be manufactured from composites, metals, or the like. The selection of material for the baffle frame may be based on specific applications, including considerations for weight, pressures, temperatures, product life, vibration considerations, and the like. The primary layer having the openings and a geometric pattern defining such openings may be formed from similar materials as the baffle frame, including composites and metals, with similar considerations. Additionally, the woven mesh layers of the secondary layers may be made from metals or composite materials, again with similar considerations. In some embodiments, the mesh structures may be formed from stainless steel or the like. It will be appreciated that in addition to the same considerations as the baffle frame, additional considerations for the primary and secondary layers may include ability to capture and direct water, ensuring sufficient space for water to flow through the material. Additionally, consideration may be made with respect to wear and operational conditions, such exposure to water and impacts of water interacting with the material of the various components (e.g., avoid rusting and the like). In one non-limiting example, the baffle frame an the primary layer may be formed of composites or stainless steel, and the secondary layer may be formed from stainless steel.

Advantageously, embodiments of the present disclosure provide for improved water collection and capture, particularly in low- or zero-gravity environments. The baffle assemblies described herein may be arranged at the outlet of any type of condensing heat exchanger that outputs moist air with droplets of liquid water. The droplets will impinge upon the baffles and be captured within openings within a primary layer of the baffles. If the droplet size is too large, the structure of the primary layer will break the large droplets of water into smaller droplets, ensuring capture of the liquid content. As such, advantageously, embodiments of the present disclosure provide an efficient mechanism to capture water from a humid air flow, and may be arranged relative to any type of condensing heat exchanger. Moreover, no coatings or unique manufacturing techniques are required, and thus the component life may be extended beyond that of conventional systems.

The use of the terms “a”, “an”, “the”, and similar references in the context of description (especially in the context of the following claims) are to be construed to cover both the singular and the plural, unless otherwise indicated herein or specifically contradicted by context. The modifier “about” used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. As used herein, the terms “about” and “substantially” are intended to include the degree of error associated with measurement of the particular quantity based upon the equipment available at the time of filing the application. For example, the terms may include a range of ±8% of a given value or other percentage change as will be appreciated by those of skill in the art for the particular measurement and/or dimensions referred to herein.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description but is only limited by the scope of the appended claims.

What is claimed is:

1. A baffle assembly for use with a condensing heat exchanger, the baffle assembly comprising:

a housing, wherein a portion of the housing has a water flow passage defined therein; and a set of baffles extending from the housing and arranged with a fluid connection with the water flow passage, wherein each baffle of the set of baffles comprises:

a baffle frame having a solid back and solid sidewalls that define an open faced baffle cavity;

a primary layer arranged within the baffle cavity, wherein the primary layer comprises a geometry pattern of openings; and a secondary layer arranged within the baffle cavity between the primary layer and the back of the baffle frame, wherein the secondary layer comprises a mesh of woven wires.

2. The baffle assembly of claim 1, wherein each baffle comprising at least one pressure channel providing the fluid connection between a respective baffle and the water flow passage.

3. The baffle assembly of claim 1, wherein the secondary layer is a first secondary layer and each baffle comprises a second secondary layer arranged between the first secondary layer and the back of the baffle frame.

4. The baffle assembly of claim 3, wherein the second secondary layer has a mesh weave that is tighter than a mesh weave of the first secondary layer.

5. The baffle assembly of claim 1, wherein each baffle has a tapered shape with a narrow end of the tapered shape proximate the fluid connection to the water flow passage.

6. The baffle assembly of claim 5, further comprising a cover enclosing a portion of the secondary layer proximate the fluid connection to the water flow passage.

7. The baffle assembly of claim 6, wherein the cover is part of the primary layer.

8. The baffle assembly of claim 1, wherein the mesh of woven wires are arranged in a Dutch twill weave.

9. The baffle assembly of claim 1, wherein the set of baffles comprise first baffles arranged at a first angle relative to a direction normal to the housing and second baffles arranged at a second angle different from the first angle.

10. The baffle assembly of claim 1, wherein the water flow passage is a first water flow passage and a second water flow passage is defined within the housing parallel to the first water flow passage, wherein the set of baffles comprise first baffles arranged with outlets fluidly coupled to the first water flow passage and second baffles arranged with outlets fluidly coupled to the second water flow passage.

11. The baffle assembly of claim 1, wherein each baffle has a first end that is fluidly coupled to the water flow passage and a second end, opposite the first end, comprising a secondary water flow assembly configured to supply a secondary flow of water through at least the mesh of woven wires that flows in a direction from the second end to the first end.

12. A heat exchanger assembly comprising:

a heat exchanger core configured to receive humid air as a first working fluid and a coolant as a second working fluid, wherein the heat exchanger is arranged to output the first working fluid as an airflow having water droplets; and a baffle assembly arranged to receive the output of the first working fluid, wherein the baffle assembly comprises:

a housing, wherein a portion of the housing has a water flow passage defined therein; and a set of baffles extending from the housing and arranged with a fluid connection with the water flow passage, wherein each baffle of the set of baffles comprises:

a baffle frame having a solid back and solid sidewalls that define an open faced baffle cavity;

a primary layer arranged within the baffle cavity, wherein the primary layer comprises a geometry pattern of openings; and a secondary layer arranged within the baffle cavity between the primary layer and the back of the baffle frame, wherein the secondary layer comprises a mesh of woven wires.

13. The heat exchanger assembly of claim 12, wherein the heat exchanger is a condensing heat exchanger of an environmental control system.

14. The heat exchanger assembly of claim 12, further comprising an outlet manifold at an outlet end of a flow path of the first working fluid through the heat exchanger core, wherein the baffle assembly is arranged within the outlet manifold.

15. The heat exchanger assembly of claim 12, wherein each baffle has a tapered shape with a narrow end of the tapered shape proximate the fluid connection to the water flow passage.

16. The heat exchanger assembly of claim 12, wherein the set of baffles comprise first baffles arranged at a first angle relative to a flow direction of the first working fluid as it exits the heat exchanger core and second baffles arranged at a second angle different from the first angle relative to the flow direction.

17. The heat exchanger assembly of claim 12, wherein the water flow passage is a first water flow passage and a second water flow passage is defined within the housing parallel to the first water flow passage, wherein the set of baffles comprise first baffles arranged with outlets fluidly coupled to the first water flow passage and second baffles arranged with outlets fluidly coupled to the second water flow passage.

18. The heat exchanger assembly of claim 12, wherein each baffle comprising at least one pressure channel providing the fluid connection between a respective baffle and the water flow passage.

19. The heat exchanger assembly of claim 12, wherein the secondary layer is a first secondary layer and each baffle comprises a second secondary layer arranged between the first secondary layer and the back of the baffle frame.

20. The heat exchanger assembly of claim 12, further comprising a water tank and pump arranged to pump water through the water flow passage and generate a pressure different at an outlet of each of the baffles.

* * * * *